United States Patent
Jeong et al.

(10) Patent No.: US 10,297,067 B2
(45) Date of Patent: May 21, 2019

(54) APPARATUS AND METHOD OF RENDERING FRAME BY ADJUSTING PROCESSING SEQUENCE OF DRAW COMMANDS

(71) Applicant: Samsung Electronics Co., Ltd., Suwon-si (KR)

(72) Inventors: Minkyu Jeong, Yongin-si (KR); Kwontaek Kwon, Hwaseong-si (KR); Minyoung Son, Hwaseong-si (KR); Jeongsoo Park, Gwacheon-si (KR); Sangoak Woo, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 96 days.

(21) Appl. No.: 15/028,277

(22) PCT Filed: Oct. 8, 2014

(86) PCT No.: PCT/KR2014/009479
§ 371 (c)(1),
(2) Date: Apr. 8, 2016

(87) PCT Pub. No.: WO2015/053557
PCT Pub. Date: Apr. 16, 2015

(65) Prior Publication Data
US 2016/0267701 A1    Sep. 15, 2016

(30) Foreign Application Priority Data

Oct. 10, 2013    (KR) .................. 10-2013-0120871

(51) Int. Cl.
*G06T 15/00*    (2011.01)
*G06T 15/40*    (2011.01)
(Continued)

(52) U.S. Cl.
CPC .............. *G06T 15/005* (2013.01); *G06T 1/60* (2013.01); *G06T 7/50* (2017.01); *G06T 15/405* (2013.01); *G06T 15/80* (2013.01)

(58) Field of Classification Search
None
See application file for complete search history.

(56) References Cited

U.S. PATENT DOCUMENTS 5,689,627 A    11/1997    Arai et al.
6,448,966 B1    9/2002    Yet
(Continued)

FOREIGN PATENT DOCUMENTS

EP    0 503 251 A2    9/1992
KR    10-0793990 B1    1/2008
KR    10-0899488 B1    5/2009

OTHER PUBLICATIONS

International Search Report dated Dec. 17, 2014 in counterpart International application No. PCT/KR2014/009479 (3 pages).

*Primary Examiner* — Saptarshi Mazumder
(74) *Attorney, Agent, or Firm* — Harness, Dickey & Pierce, P.L.C.

(57) ABSTRACT

Provided are methods and apparatuses for adjusting the processing sequence of draw commands for rendering images. The rendering method including determining, at a processing sequence determiner, previous draw commands that are identical to current draw commands; de-termining a processing sequence of the current draw commands based on depth information of the determined previous draw commands; and performing a Z-test on the current draw commands based on the processing sequence, and performing shading based on a result of the Z-test.

15 Claims, 5 Drawing Sheets

(51) Int. Cl.
  *G06T 15/80* (2011.01)
  *G06T 1/60* (2006.01)
  *G06T 7/50* (2017.01)

(56) References Cited

U.S. PATENT DOCUMENTS

| | | |
|---|---|---|
| 7,456,846 B1 | 11/2008 | King et al. |
| 8,154,547 B2 | 4/2012 | Min et al. |
| 8,232,991 B1 | 7/2012 | French et al. |
| 8,933,933 B2 | 1/2015 | French et al. |
| 2004/0012599 A1 | 1/2004 | Laws |
| 2005/0068319 A1 | 3/2005 | Kim et al. |
| 2006/0114261 A1 | 6/2006 | Morphet |
| 2007/0236495 A1 | 10/2007 | Gruber et al. |
| 2009/0284526 A1 | 11/2009 | Surti et al. |
| 2011/0199377 A1* | 8/2011 | Jang .................. G06T 15/20 345/426 |
| 2014/0267256 A1* | 9/2014 | Heggelund ............ G06T 15/40 345/421 |

* cited by examiner

[Fig. 1]
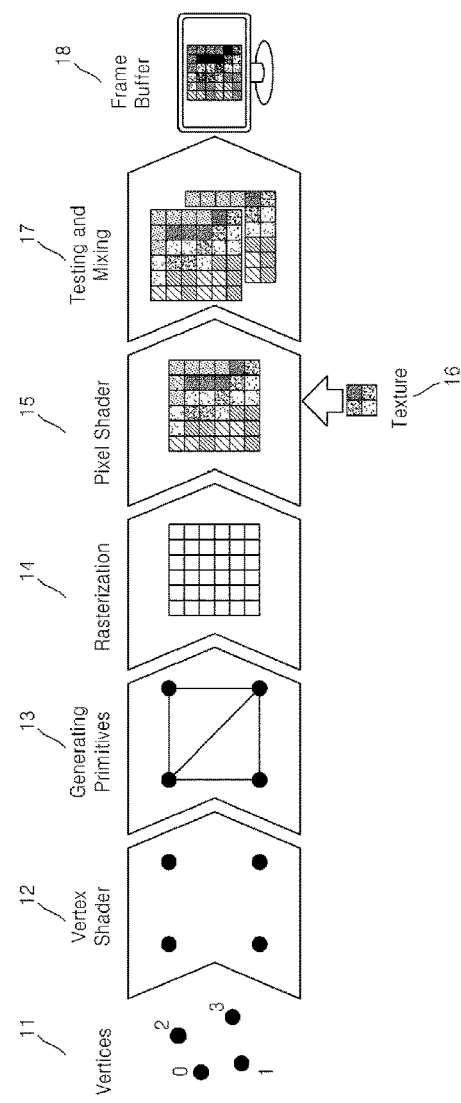
[Fig. 2]
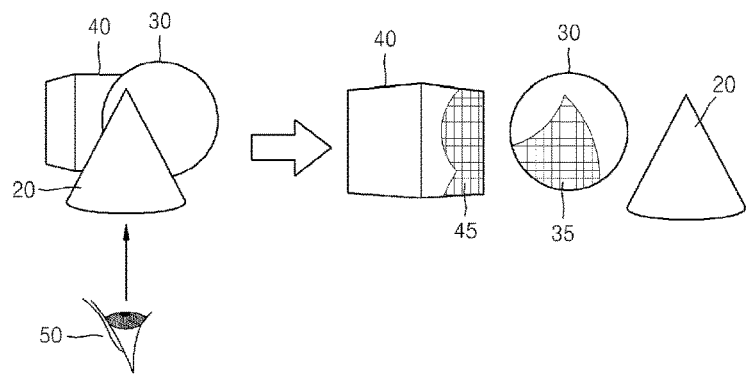

[Fig. 3]
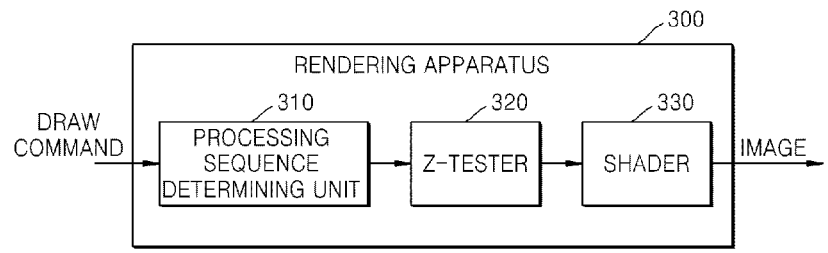
[Fig. 4]
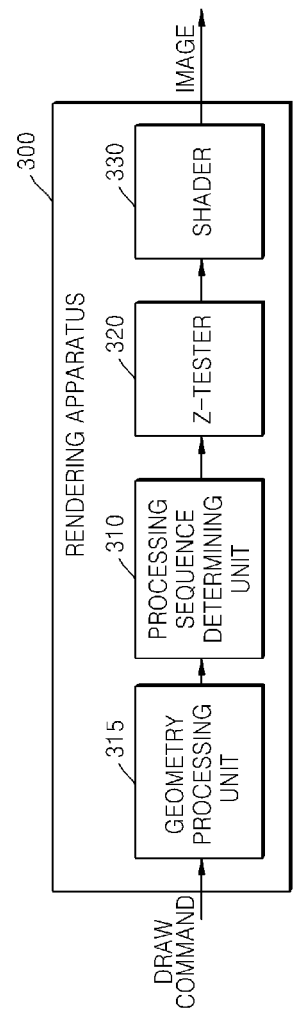

[Fig. 5]
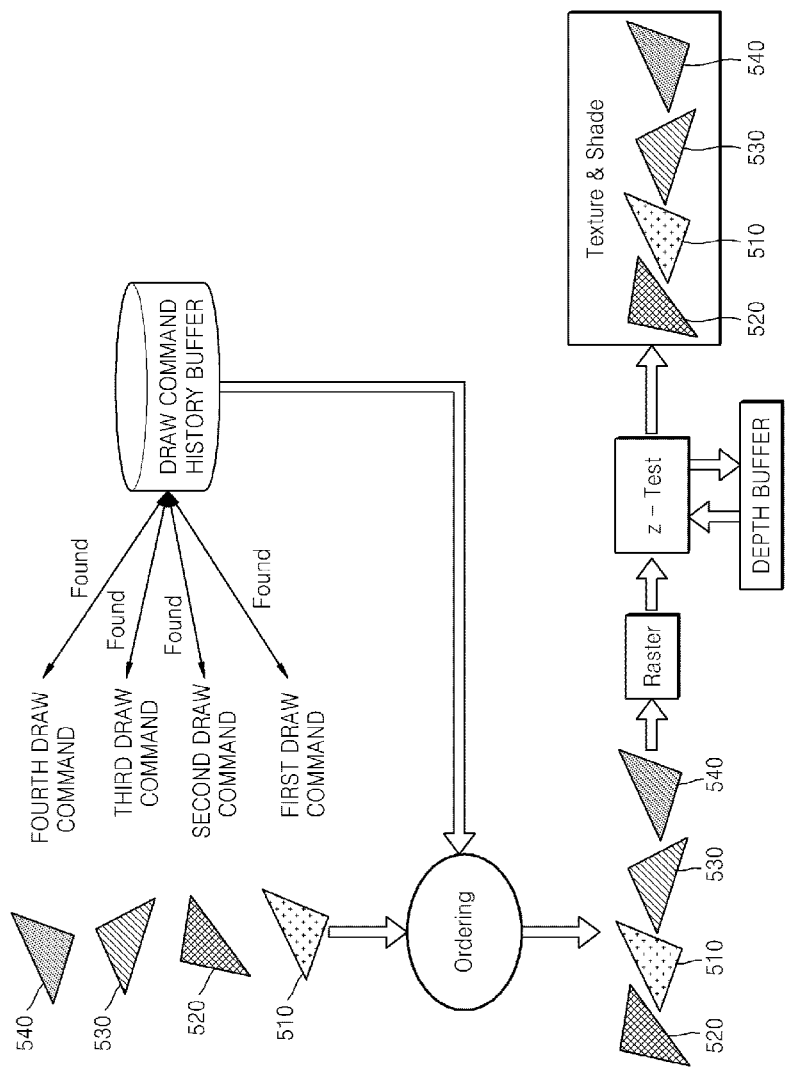

[Fig. 6]
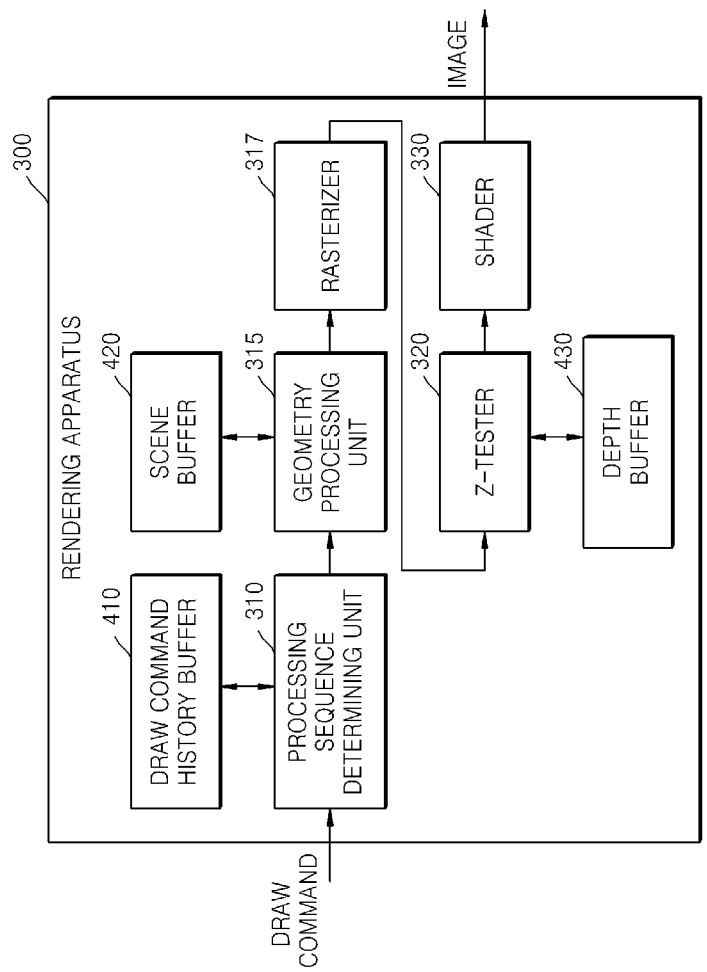

[Fig. 7]
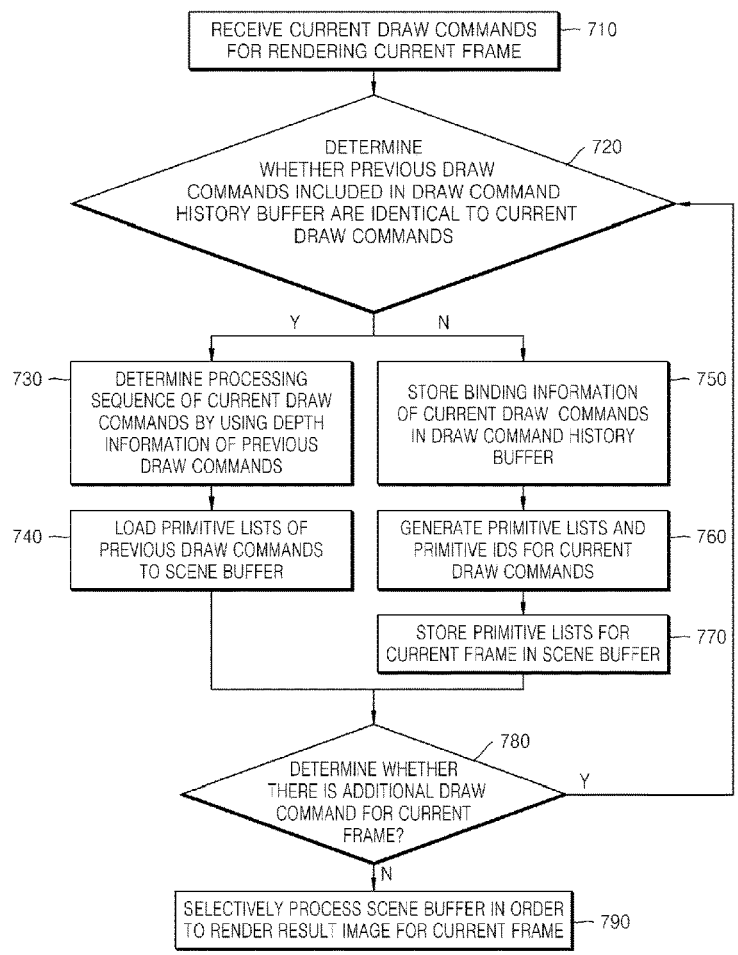
[Fig. 8]
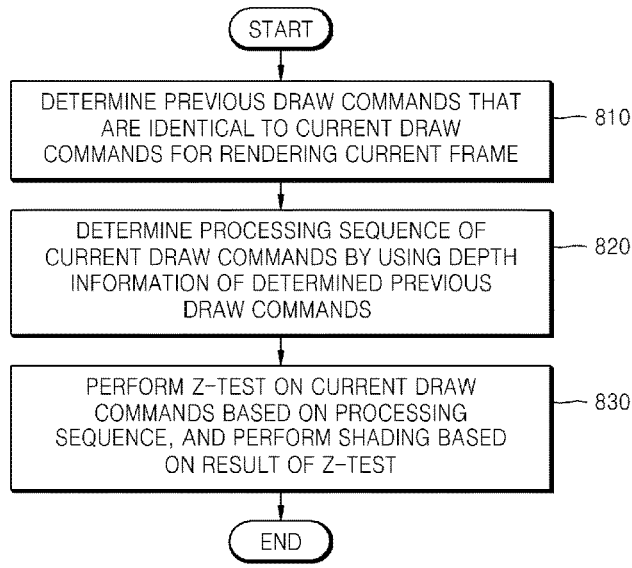

APPARATUS AND METHOD OF RENDERING FRAME BY ADJUSTING PROCESSING SEQUENCE OF DRAW COMMANDS

CROSS-REFERENCE TO RELATED APPLICATIONS

This application is a U.S. national stage application of International Application No. PCT/KR2014/009479 filed on Oct. 8, 2014, which claims the benefit of Korean Patent Application No. 10-2013-0120871 filed on Oct. 10, 2013, in the Korean Intellectual Property Office, the entire disclosures of which are incorporated herein by reference for all purposes.

TECHNICAL FIELD

The following description relates to apparatuses and methods of rendering three-dimensional (3D) images.

BACKGROUND ART

Three-dimensional (3D) graphics application programming interface (API) standards include OpenGL, OpenGL ES, and Direct 3. API standards include a method of performing rendering on each frame and displaying an image. When rendering is performed on each frame, a large amount of computation is performed and a large amount of power is consumed. Accordingly, it is desirable to reduce the computational amount and the number of accesses to a memory when rendering is performed.

DISCLOSURE OF INVENTION

Solution to Problem

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Advantageous Effects of Invention

According to the one or more of the above embodiments of the present invention, a processing sequence of draw commands may be adjusted by applying depth information of an object or a primitive obtained from a previous frame to an object or a primitive of a current frame. The computational amount for shading an object having a great depth value may be reduced by sequentially performing shading using a Z-test beginning from an object having a small depth value. Whether an inter-frame coherent object is included may be determined by determining whether draw commands are identical to each other.

BRIEF DESCRIPTION OF DRAWINGS

FIG. 1 is a diagram illustrating an example of a process of processing a three-dimensional (3D) image.

FIG. 2 is a diagram illustrating an example of shading using a Z-test according to a depth of an object;

FIG. 3 is a diagram illustrating an example of a rendering apparatus.

FIG. 4 is a diagram illustrating an example of the rendering apparatus.

FIG. 5 is a diagram illustrating an example of a rendering method.

FIG. 6 is a diagram illustrating an example of the rendering apparatus.

FIG. 7 is a diagram illustrating an example of a rendering method.

FIG. 8 is a diagram illustrating an example of a rendering method.

BEST MODE FOR CARRYING OUT THE INVENTION

In one general aspect there is provided a rendering method including determining, at a processing sequence determiner, previous draw commands that are identical to current draw commands; determining a processing sequence of the current draw commands based on depth information of the determined previous draw commands; and performing a Z-test on the current draw commands based on the processing sequence, and performing shading based on a result of the Z-test.

The determining of the processing sequence may include comparing depth values of the determined previous draw commands, and determining the processing sequence of the current draw commands in an ascending order of the depth values.

The determining of the processing sequence may include comparing depth values of objects included in the determined previous draw commands, and determining the processing sequence of the current draw commands in an ascending order of the depth values.

The rendering method may include generating primitive lists for the current draw commands, wherein the determining of the processing sequence may include comparing depth values of the primitive lists, and determining the processing sequence of the current draw commands in an ascending order of the depth values.

The rendering method may include obtaining a depth value by performing geometry processing on a current draw command that has no identical previous draw command from among the current draw commands, wherein the determining of the processing sequence may comprise determining a processing sequence of the current draw commands based on the obtained depth value.

The determining of the previous draw commands that are identical to the current draw commands includes comparing binding information of the current draw commands with binding information of the previous draw commands; and determining the previous draw commands that are identical to the current draw commands based on a result of the comparison.

The rendering method may include storing, in a draw command history buffer, information of a current draw command that has no identical previous draw command.

The information of a current draw command may include at least one of draw command ID, binding information, or depth information of the current draw command.

The rendering method may include generating fragments based on the current draw commands, wherein the performing of the Z-test comprises comparing a depth value of the fragments at a position with depth values of fragments that have been input at the position, and outputting a fragment for shading in response to the depth value of the fragment being the smallest.

In another general aspect there is provided a rendering apparatus including a processing sequence determiner configured to determine previous draw commands that are identical to current draw commands, and to determine a processing sequence of the current draw commands by using depth information of the determined previous draw commands; a Z-tester configured to perform a Z-test on the current draw commands according to the processing sequence; and a shader configured to perform shading based on a result of the Z-test.

The processing sequence determiner may be further configured to compare depth values of the determined previous draw commands, and to determine the processing sequence of the current draw commands in an ascending order of the depth values.

The processing sequence determiner may be further configured to compare depth values of objects included in the determined previous draw commands, and to determine the processing sequence of the current draw commands in an ascending order of the depth values.

The apparatus may include a geometry processor configured to generate primitive lists for the current draw commands, wherein the processing sequence determiner is further configured to compare depth values of the primitive lists, and to determine the processing sequence of the current draw commands in an ascending order of the depth values.

The apparatus may include a geometry processor configured to obtain a depth value by performing geometry processing on a current draw command that has no identical previous draw command from among the current draw commands, wherein the processing sequence determiner is further configured to determine a processing sequence of the current draw command that has no identical previous draw command based on the obtained depth value.

The processing sequence determiner may be further configured to compare binding information of the current draw commands with binding information of the previous draw commands, and to determine the previous draw commands that are identical to the current draw commands based on a result of the comparison.

The processing sequence determiner may be further configured to store, in a draw command history buffer, information of a current draw command that has no identical previous draw command.

In another general aspect there is provided a rendering method including receiving draw commands; determining, at a processing sequence determiner, the processing sequence of the received draw commands; generating fragments based on the current draw commands; and comparing a depth value of all fragments that have been input at a position, and outputting, for shading, a fragment with a smallest depth value at the position.

The processing sequence of the received draw commands may be based on the depth values of previous draw commands that are identical to the received draw commands.

In response to any received draw commands not being identical to previous draw commands, determining a processing sequence of the distinct current draw command based on the obtained depth value of the distinct current draw command.

Other features and aspects will be apparent from the following detailed description, the drawings, and the claims.

MODE FOR THE INVENTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a process of processing a three-dimensional (3D) image, the process including operations 11 through 17. The operations in FIG. 1 may be performed in the sequence and manner as shown, although the order of some operations may be changed or some of the operations omitted without departing from the spirit and scope of the illustrative examples described.

Operation 11 is an operation of generating vertices indicating an image. The vertices are generated in order to describe objects included in the image.

Operation 12 is an operation of shading the generated vertices. A vertex shader may perform shading on the vertices by assigning colors to the vertices generated in operation 11.

Operation 13 is an operation of generating primitives. The term 'primitive' refers to a polygon that is formed of points, lines, or vertices. For example, a primitive may be a triangle formed by connecting three vertices.

Operation 14 is an operation of rasterizing a primitive. When the primitive is rasterized, the primitive is divided into a plurality of fragments. The term 'fragment' refers to a portion of a primitive and may be a basic unit for performing image processing. A primitive includes only information about vertices. Accordingly, interpolation is performed when fragments between vertices are generated during rasterization.

Operation 15 is an operation of shading pixels. Although shading is performed in units of pixels, shading may be performed in units of fragments. For example, when pixels or fragments are shaded, it means that colors are assigned to the pixels or the fragments.

Operation 16 is an operation of texturing the pixels or the fragments. Texturing is a method of using a previously generated image to designate a color is assigned to a pixel or a fragment. For example, when a color is assigned to a fragment, shading is performed through computation whereas texturing is performed by assigning the same color as a color of an image, which has been previously generated to a fragment corresponding to the image.

In operation 15 or 16, a large amount of computation is required to shade or texture each pixel or fragment. Accordingly, it is advantageous to reduce the computational amount by more efficiently performing shading or texturing. Examples of a representative methods of reducing the computational amount during shading include, but are not limited to, Z-test (or a depth test) and hidden surface removal (HSR).

Operation 17 is an operation of performing testing and mixing.

Operation 18 is an operation of displaying a frame that is stored in a frame buffer. A frame generated through operations 11 through 17 is stored in the frame buffer. The frame that is stored in the frame buffer is displayed on a display device.

FIG. 2 is a diagram illustrating an example of shading using a Z-test according to a depth of an object.

Shading using a Z-test is a representative method of reducing the required computation during rendering. The shading using a Z-test does not perform shading on a first object that is covered by a second object that is located in front of the first object. In other words, the shading using a Z-test compares depth values of objects and performs shading only on an object that is located ahead.

When a plurality of objects exist in a 3D space, the plurality of objects may overlap with one another. A plurality of objects, for example, first through third objects 20, 30, and 40, exist in a 3D space in FIG. 2. When the first through third objects 20, 30, and 40 are seen from a focal point 50, the first through third objects 20, 30, and 40 overlap with one another A part 35 of the second object 30 is covered by the first object 20. Also, a part 45 of the third object 40 is covered by the first and second objects 20 and 30. Since parts 35 and 45 are covered by the objects that are located in front of them, colors do not need to be assigned to the parts 35 and 45. Accordingly, shading is not performed on the parts 35 and 45.

The shading using a Z-test may be performed in units of objects. When the third object 40, which is located far away from a viewpoint, is first processed, the parts 35 and 45 that are covered by the first and second objects 20 and 30 are shaded. Since the parts 35 and 45 are covered by the first and second objects 20 and 30, which are subsequently processed, the shading of the parts 35 and 45 is unnecessary when the third object 40 is first shaded. Accordingly, the computation required for shading may be reduced by using a processing sequence of the first through third objects 20, 30, and 40.

For example, when the first through third objects 20, 30, and 40 are sequentially processed, the part 35 of the second object 30 has a depth value greater than that of the first object 20 during a Z-test. Accordingly, the part 35 is not shaded. Also, the part 45 of the third object 40 has a depth value greater than that of the first or second object 20 or 30 during a Z-test. Accordingly, the part 45 is not shaded.

FIG. 3 is a diagram illustrating an example of a rendering apparatus 300. Referring to FIG. 3, the rendering apparatus 300 includes a processing sequence determining unit 310, a Z-tester 320, and a shader 330. The rendering apparatus 300 receives a draw command, renders a current frame, and outputs an image. The term "rendering" refers to a process of determining a color of a frame in a two-dimensional (2D) coordinate system and storing the color of the frame in a frame buffer. Rendering refers to a process of generating a 2D image to be displayed. Also, the rendering may refer to a process of generating a 2D image that varies according to a viewpoint. Accordingly, during rendering, a part not seen in a 3D space is removed, and colors of pixels or fragments constituting a 2D image are determined.

Shading using a Z-test is most efficient when draw commands are sequentially processed beginning from an object that is the closest to a viewpoint. A developer may designate a processing sequence of draw commands. Even when the developer does not designate the processing sequence of the draw commands, the rendering apparatus 300 may reduce the computation required for shading using a Z-test by readjusting the processing sequence of the draw commands.

The processing sequence determining unit 310 determines previous draw commands that are identical to current draw commands for rendering a current frame, and determines a processing sequence of the current draw commands by using depth information of the determined previous draw commands.

The processing sequence determining unit 310 compares binding information of the current draw commands with binding information of the previous draw commands, and determines the previous draw commands that are identical to the current draw commands based on the comparison. The processing sequence determining unit 310 compares the previous draw commands that are stored in a draw command history buffer (shown in FIG. 6) with the input current draw commands.

The processing sequence determining unit 310 may determine whether the draw commands are identical to each other using the binding information. The processing sequence determining unit 310 compares the binding information of the current draw commands with the binding information of the previous draw commands. The term "binding information" refers to information indicating which data a draw command uses as an input.

The processing sequence determining unit 310 determines depth values of the previous draw commands as depth values of the current draw commands. The processing sequence determining unit 310 determines depth values of the previous draw commands that have the same binding information as that the current draw commands as depth values of the current draw commands.

The processing sequence determining unit 310 determines a processing sequence of the current draw commands by using the depth values of the current draw commands. The processing sequence determining unit 310 determines the depth values of the input current draw commands through the process described above, and updates the processing sequence of the current draw commands based on the determined depth values.

The processing sequence determining unit 310 may compare depth values of objects included in the determined previous draw commands, and may determine the processing sequence of the current draw commands in an ascending order of the depth values. The term "depth value of an object" may refer to a distance between a viewpoint to a closest point of the object.

The processing sequence determining unit 310 may compare depth values of primitive lists, and may determine the processing sequence of the current draw commands in an ascending order of the depth values. When depth values of primitives of a first draw command are greater than depth values of primitives of a second draw command, the processing sequence determining unit 310 assigns a processing sequence with a lower priority to the first draw command than the second draw command. Alternatively, the processing sequence determining unit 310 may compare an average of the depth values of the primitives of the first draw command with an average of the depth values of the primitives of the second draw command, and may determine a processing sequence of the first and second draw commands.

The processing sequence determining unit 310 may compare depth values of the draw commands in various other ways without departing from the spirit and scope of the illustrative examples described.

The processing sequence determining unit 310 separately obtains a depth value of a current draw command that has no identical previous draw command from among the current draw commands, and determines a processing sequence based on the obtained depth value. Since the current draw command is not identical to any of the previous draw commands, the processing sequence determining unit 310 may not obtain a depth value from the previous draw commands. Accordingly, the processing sequence determining unit 310 may calculate the depth value of the current draw command separately from a Z-test.

In another non-exhaustive example, the processing sequence determining unit 310 may assign a processing sequence with a highest priority or a lowest priority to the current draw command that has no identical previous draw command from among the current draw commands.

The processing sequence determining unit 310 may assign a processing sequence to the current draw command that has no identical previous draw command in various other ways without departing from the spirit and scope of the illustrative examples described.

The Z-tester 320 performs a Z-test on the current draw commands according to the determined processing sequence. The Z-tester 320 compares depth values of duplicate fragments in the same pixel, and outputs only a fragment having a smallest depth value to the shader 330. Accordingly, the Z-tester 320 compares depth values of fragments in the same pixel, and outputs only a fragment having a smaller depth value to the shader 330.

The shader 330 shades an object based on a result of the Z-test. The shader 330 shades only a fragment input according to the result of the Z-test. The shader 330 does not shade a fragment having a greater depth value in a pixel having duplicate fragments.

FIG. 4 is a diagram illustrating an example of the rendering apparatus 300. The rendering apparatus 300 of FIG. 4 is a modification of the rendering apparatus 300 of FIG. 3. The description of the rendering apparatus 300 of FIG. 3 is also applicable to FIG. 4, and thus will not be repeated here.

Referring to FIG. 4, the rendering apparatus 300 further includes a geometry processing unit 315. The rendering apparatus 300 may perform geometry processing on input current draw commands and may determine a processing sequence of the current draw commands. The term "geometry processing" refers to a process of converting an object in a 3D coordinate system according to a viewpoint, and projecting the object to a 2D coordinate system. The geometry processing includes a process of performing vertex shading and a process of generating primitives. Each of the primitives is generated by connecting vertices. For example, a primitive may be a polygon such as a triangle or a quadrangle.

The geometry processing unit 315 may generate primitive lists by performing geometry processing on the current draw commands. Also, when there are previous draw commands that are identical to the current draw commands, the geometry processing unit 315 may use a result of geometry processing on the previous draw commands. Since a result of geometry processing on the previous draw commands and a result of geometry processing on the current draw commands may be the same, the geometry processing unit 315 does not perform geometry processing on the current draw commands. When two draw commands exist and data used by the two draw commands are the same, execution results of the two draw commands are the same, i.e., primitive lists generated with the two draw commands are the same.

The geometry processing unit 315 may determine depth values of the current draw commands based on a result of the geometry processing. The processing sequence determining unit 310 determines a processing sequence of the current draw commands by using the determined depth values.

FIG. 5 is a diagram illustrating an example of a rendering method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. Referring to FIG. 5, first through fourth draw commands are input to the rendering apparatus 300 in order to render a current frame.

The rendering apparatus 300 readjusts a processing sequence of the first through fourth draw commands. The rendering apparatus 300 searches a draw command history buffer for previous draw commands that are identical to the first through fourth draw commands. When there are previous draw commands that are identical to the first through fourth draw commands, the rendering apparatus 300 obtains depth values of first through fourth objects 510 through 540 of the first through fourth draw commands. The rendering apparatus 300 readjusts the processing sequence of the first through fourth objects 510 through 540 in an ascending order of the depth values of the first through fourth objects 510 through 540.

For example, if the depth values increase in an order of the fourth object 540, the third object 530, the first object 510, and the second object 520, as shown in FIG. 5, the rendering apparatus 300 readjusts the processing sequence to an order of the fourth object 540, the third object 530, the first object 510, and the second object 520. The readjusted objects 510 through 540 are sequentially rasterized, Z-tested, textured, and shaded.

FIG. 6 is a diagram illustrating an example of the rendering apparatus 300. The rendering apparatus 300 of FIG. 6 is a modification of the rendering apparatus 300 of FIG. 3. The description of the rendering apparatus 300 of FIG. 3 is also applicable to FIG. 6, and thus will not be repeated here.

Referring to FIG. 6, the processing sequence determining unit 310 compares current draw commands with previous draw commands, and outputs a result of the comparison to the geometry processing unit 315. A draw command history buffer 410 stores binding information, an identification (ID), and depth information of each draw command. The processing sequence determining unit 310 searches the draw command history buffer 410 for binding information that is identical to binding information of the current draw commands. When the binding information that is identical to the biding information of the current draw command is stored in the draw command history buffer 410, the processing sequence determining unit 310 obtains depth information of the previous draw commands that are identical to the current draw commands stored in the draw command history buffer 410.

When previous draw commands are identical to the current draw commands, the processing sequence determining unit 310 determines a processing sequence of the current draw commands by using depth information of the previous draw commands. The processing sequence determining unit 310 determines the processing sequence of the current draw commands in an ascending order of depth values. The processing sequence determining unit 310 outputs IDs of the previous draw commands that are identical to the current draw commands to the geometry processing unit 315.

The geometry processing unit 315 uses a result of geometry processing on the previous draw commands. The geometry processing unit 315 searches a scene buffer 420 for primitive lists having IDs that are identical to the IDs of the previous draw command, and outputs the found primitive lists to a rasterizer 317. The geometry processing unit 315 may omit performing geometry processing on the current draw commands.

Draw commands of n previous frames are stored in the draw command history buffer 410. The draw commands stored in the draw command history buffer 410 have unique IDs. The processing sequence determining unit 310 may output IDs of draw commands to the geometry processing unit 315, and may output information indicating which previous draw commands are identical to the current draw commands to the geometry processing unit 315.

Primitive lists for the draw commands of the n previous frames are stored in the scene buffer 420. The primitive lists stored in the scene buffer 420 are identified with IDs of the corresponding draw commands. Accordingly, the geometry processing unit 315 may compare the IDs of the previous draw commands with IDs of primitive lists stored in the scene buffer 420, and may identify the primitive lists that are a result of the geometry processing on the previous draw commands. The term "draw command ID" refers to a unique name for identifying each draw command. The term "primitive list ID" refers to a unique name for identifying each primitive list.

The processing sequence determining unit 310 stores information of a current draw command that has no identical previous draw command in the draw command history buffer 410. When no previous draw command is identical to the current draw command, the processing sequence determining unit 310 assigns an ID to the current draw command, and stores the ID, binding information, and depth information of the current draw command in the draw command history buffer 410. The draw command history buffer 410 is updated whenever a new draw command is input.

The rasterizer 317 divides each of primitives included in the input primitive lists into fragments. The rasterizer 317 outputs the fragments to the Z-tester 320.

The Z-tester 320 performs a Z-test on the input primitives. The Z-tester 320 performs a Z-test on the primitives according to the processing sequence determined by the processing sequence determining unit 310. The Z-tester 320 outputs to the shader 330 only a fragment having a depth value that is smaller than that of fragments of the primitive lists that have been input until the present time. The Z-tester 320 compares a depth value of a fragment that is being Z-tested with depth values of fragments that have been input until the present time at the same position, and outputs a fragment that is being Z-tested to the shader 330 only when a depth value of the fragment that is being Z-tested is the smallest. The Z-tester 320 uses a depth buffer 430 during the Z-test. The shader 330 assigns a color to the fragment output from the Z-tester 320. The shader 330 outputs an image when shading on all draw commands for a current frame ends.

FIG. 7 is a diagram illustrating an example of a rendering method, illustrating operations performed by the rendering apparatus 300. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. The description for the rendering apparatus 300 applies to the rendering method of FIG. 7, and thus will not be repeated here.

In operation 710, the rendering apparatus 300 receives current draw commands for rendering a current frame.

In operation 720, the rendering apparatus 300 determines whether previous draw commands that are identical to the current draw commands are included in the draw command history buffer 410. In operation 720, when it is determined that the previous draw commands in the draw command history buffer 410 are identical to the current draw commands, the rendering method proceeds to operation 730. Otherwise, the rendering method proceeds to operation 750.

In operation 730, the rendering apparatus 300 determines a processing sequence of the current draw commands by using depth information of the previous draw commands. The rendering apparatus 300 compares depth information of draw commands that have been input until the present time with depth information of a current draw command, and updates a processing sequence of draw commands for the current frame. For example, a processing sequence of first through third draw commands that have been input until the present time is in the order of the second draw command, the third draw command, and the first draw command. When a depth value of the current draw command is greater than that of the second draw command and is smaller than that of the third draw command, the rendering apparatus 300 updates the processing sequence as the second draw command, the current draw command, the third draw command, and the first draw command. The rendering apparatus 300 updates the processing sequence of the draw commands whenever a draw command for the current frame is input.

In operation 740, the rendering apparatus 300 loads primitive lists of the previous draw commands to the scene buffer 420. Since there are the previous draw commands that are identical to the current draw commands, the rendering apparatus 300 uses the primitive lists of the identical previous draw commands as primitive lists of the current draw commands.

In operation 750, the rendering apparatus 300 stores binding information of the current draw commands in the draw command history buffer 410. The stored binding information is used when being compared with that of a draw command that is subsequently input. In operation 760, the rendering apparatus 300 generates primitive lists and primitive IDs of the current draw commands. In operation 770, the rendering apparatus 300 stores the primitive lists for the current frame in the scene buffer 420.

In operation 780, the rendering apparatus 300 determines whether there is an additional draw command for the current frame. When there is an additional draw command for the current frame, the rendering method returns to operation 720, and otherwise, proceeds to operation 790.

In operation 790, the rendering apparatus 300 selectively processes the scene buffer 420 in order to render a result image for the current frame. The rendering apparatus 300 generates the result image by processing the primitive lists stored in the scene buffer 420.

FIG. 8 is a diagram illustrating an example of a rendering method. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. The description for the rendering apparatus 300 applies to the rendering method of FIG. 8, and thus will not be repeated here.

In operation 810, the rendering apparatus 300 determines previous draw commands that are identical to current draw commands for rendering a current frame.

In operation 820, the rendering apparatus 300 determines a processing sequence of the current draw commands by using depth information of the determined previous draw commands. The rendering apparatus 300 renders a previous frame, and stores depth information of an object, a primitive, or a fragment during the rendering. The rendering apparatus 300 determines the processing sequence of the current draw commands by using the depth information stored while rendering the current frame.

In operation 830, the rendering apparatus 300 performs a Z-test on the current draw commands according to the processing sequence, and performs shading based on a result of the Z-test.

According to the one or more of the above embodiments of the present invention, a processing sequence of draw commands may be adjusted by applying depth information of an object or a primitive obtained from a previous frame to an object or a primitive of a current frame. The computational amount for shading an object having a great depth value may be reduced by sequentially performing shading using a Z-test beginning from an object having a small depth value. Whether an inter-frame coherent object is included may be determined by determining whether draw commands are identical to each other.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A rendering method comprising:
searching a draw command history buffer for binding information of previous draw commands that is identical to binding information of current draw commands;
determining, at a processing sequence determiner, the previous draw commands that are identical to the current draw commands, based on comparing the binding information of the current draw commands with the binding information of the previous draw commands, and determining the previous draw commands that are identical to the current draw commands based on a result of the comparison, wherein binding information of a given draw command is information indicating which data the given draw command uses as an input;
obtaining depth values of the determined previous draw commands that are identical to the current draw commands from the draw command history buffer, and comparing the obtained depth values;
adjusting a processing sequence of the current draw commands based on an ascending order of the obtained depth values of the determined previous draw commands that are identical to the current draw commands;
performing a Z-test on the current draw commands based on the adjusted processing sequence, wherein the performing of the Z-test includes comparing depth values of duplicate fragments in a same pixel, and outputting only a fragment having a smallest depth value among the duplicate fragments in the same pixel for shading based on a result of the comparison; and
performing shading of only the output fragment based on a result of the Z-test, wherein shading is not performed for any fragment having a greater depth value than the output fragment among the duplicate fragments in the same pixel.

2. The rendering method of claim 1, wherein the adjusting of the processing sequence comprises comparing depth values of objects included in the determined previous draw commands, and adjusting the processing sequence of the current draw commands in an ascending order of the depth values of the objects.

3. The rendering method of claim 1, further comprising generating primitive lists for the current draw commands, wherein the adjusting of the processing sequence comprises comparing depth values of the primitive lists, and adjusting the processing sequence of the current draw commands in an ascending order of the depth values of the primitive lists.

4. The rendering method of claim 1, further comprising obtaining a depth value by performing geometry processing on a current draw command that has no identical previous draw command from among the current draw commands, wherein the adjusting of the processing sequence comprises determining a processing sequence of the current draw commands based on the obtained depth value.

5. The rendering method of claim 1, further comprising storing, in the draw command history buffer, information of a current draw command that has no identical previous draw command.

6. The rendering method of claim 5, wherein the information of the current draw command that has no identical previous draw command comprises at least one of a draw command ID, binding information, or depth information of the current draw command.

7. The rendering method of claim 1, further comprising generating fragments based on the current draw commands.

8. A rendering apparatus comprising:
a memory storing a program of instructions; and
a processor configured to execute the program of instructions to
search a draw command history buffer for binding information of previous draw commands that is identical to binding information of current draw commands,
determine the previous draw commands that are identical to the current draw commands, based on comparing the binding information of the current draw commands with the binding information of the previous draw commands, and determining the previous draw commands that are identical to the current draw commands based on a result of the comparison, wherein binding information of a given draw command is information indicating which data the given draw command uses as an input,
obtain depth values of the determined previous draw commands that are identical to the current draw commands from the draw command history buffer, and compare the obtained depth values,
adjust a processing sequence of the current draw commands based on an ascending order of the obtained depth values of the determined previous draw commands that are identical to the current draw commands,
perform a Z-test on the current draw commands according to the adjusted processing sequence, wherein the performing of the Z-test includes comparing depth values of duplicate fragments in a same pixel, and outputting only a fragment having a smallest depth value among the duplicate fragments in the same pixel for shading based on a result of the comparison, and
perform shading of only the output fragment based on a result of the Z-test, wherein shading is not performed for any fragment having a greater depth value than the output fragment among the duplicate fragments in the same pixel.

9. The rendering apparatus of claim 8, the processor further configured to execute the program of instructions to
compare depth values of objects included in the determined previous draw commands, and
adjust the processing sequence of the current draw commands in an ascending order of the depth values of the objects.

10. The rendering apparatus of claim 8, the processor further configured to execute the program of instructions to
generate primitive lists for the current draw commands, compare depth values of the primitive lists, and
adjust the processing sequence of the current draw commands in an ascending order of the depth values of the primitive lists.

11. The rendering apparatus of claim 8, the processor further configured to execute the program of instructions to
obtain a depth value by performing geometry processing on a current draw command that has no identical previous draw command from among the current draw commands, and
determine a processing sequence of the current draw command that has no identical previous draw command based on the obtained depth value.

12. The rendering apparatus of claim 8, the processor further configured to execute the program of instructions to store, in the draw command history buffer, information of a current draw command that has no identical previous draw command, wherein the information of the current draw command that has no identical previous draw command comprises at least one of a draw command ID, binding information, or depth information of the current draw command.

13. A non-transitory computer-readable recording medium having embodied thereon a program for executing the rendering method of claim 1.

14. A rendering method comprising:
receiving current draw commands;
searching a draw command history buffer for binding information of previous draw commands that is identical to binding information of the current draw commands;
determining, at a processing sequence determiner, the previous draw commands that are identical to the current draw commands based on comparing the binding information of the current draw commands with the binding information of the previous draw commands, and determining the previous draw commands that are identical to the current draw commands based on a result of the comparison, wherein binding information of a given draw command is information indicating which data the given draw command uses as an input;
obtaining depth values of the determined previous draw commands that are identical to the current draw commands from the draw command history buffer, and comparing the obtained depth values;
adjusting a processing sequence of the current draw commands based on an ascending order of the depth values of the determined previous draw commands that are identical to the current draw commands;
generating fragments based on the current draw commands;
comparing a depth value of all fragments that have been input at a same position, and outputting, for shading, only a fragment with a smallest depth value at the same position based on a result of the comparison; and performing shading of only the output fragment, wherein shading is not performed for any fragment with a greater depth value than the output fragment among all of the fragments that have been input at the same position.

15. The rendering method of claim 14, wherein in response to any current draw command not being identical to previous draw commands, determining a processing sequence of the non-identical current draw command based on an obtained depth value of the non-identical current draw command.

* * * * *